(12) United States Patent
Castner et al.

(10) Patent No.: US 11,366,047 B2
(45) Date of Patent: *Jun. 21, 2022

(54) VACUUM MANIFOLD FOR FILTRATION MICROSCOPY

(71) Applicant: Optofluidics Inc., Philadelphia, PA (US)

(72) Inventors: Thomas Castner, Jenkintown, PA (US); Robert Hart, Philadelphia, PA (US); Colby Ashcroft, Philadelphia, PA (US); Brian DiPaolo, Marlton, NJ (US); Nathan Wall, Philadelphia, PA (US)

(73) Assignee: Optofluidics Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/116,203

(22) Filed: Dec. 9, 2020

(65) Prior Publication Data

US 2021/0102881 A1    Apr. 8, 2021

Related U.S. Application Data

(63) Continuation of application No. 16/394,173, filed on Apr. 25, 2019, now Pat. No. 10,890,514.

(Continued)

(51) Int. Cl.
*G01N 15/02* (2006.01)
*G01N 15/14* (2006.01)
*G06T 7/00* (2017.01)

(52) U.S. Cl.
CPC ......... *G01N 15/0227* (2013.01); *G01N 15/14* (2013.01); *G06T 7/001* (2013.01);
(Continued)

(58) Field of Classification Search
CPC ........... G01N 15/0205; G01N 15/0227; G01N 15/02; G01N 15/0211; G01N 15/147
(Continued)

(56) References Cited

U.S. PATENT DOCUMENTS

| | | | |
|---|---|---|---|
| 2010/0009460 A1* | 1/2010 | Clark | B01D 61/18 436/180 |
| 2012/0074060 A1* | 3/2012 | Lass | B01D 65/02 210/636 |

(Continued)

*Primary Examiner* — Md M Rahman
(74) *Attorney, Agent, or Firm* — Riverside Law LLP

(57) ABSTRACT

A vacuum manifold for filtration microscopy includes a manifold top having multiple openings, and a capture membrane positioned above and spaced apart from the manifold top, where the capture membrane is configured to deflect into contact with a surface of the manifold top when a negative pressure is applied to the multiple openings. A method for filtration microscopy includes the steps of providing a vacuum manifold including a manifold top having a plurality of openings, and a capture membrane positioned above and spaced apart from the manifold top; applying sample drops to sample spots on the membrane, the sample spots positioned above the plurality of openings; applying a negative pressure to the openings such that the capture membrane contacts a surface of the manifold top; and optically imaging particulates on the capture membrane.

26 Claims, 19 Drawing Sheets

Related U.S. Application Data

(60) Provisional application No. 62/662,370, filed on Apr. 25, 2018.

(52) U.S. Cl.
CPC ............... *G01N 2015/1493* (2013.01); *G06T 2207/10056* (2013.01)

(58) Field of Classification Search
USPC ........................................................ 356/335
See application file for complete search history.

(56) References Cited

U.S. PATENT DOCUMENTS

| 2013/0316363 | A1* | 11/2013 | Wainwright | ....... | G01N 21/6428 |
| | | | | | 435/6.15 |
| 2017/0113221 | A1* | 4/2017 | Hoffman | ........... | B01L 3/502715 |
| 2017/0348470 | A1* | 12/2017 | D'Ambrosio | ....... | A61M 60/135 |

* cited by examiner

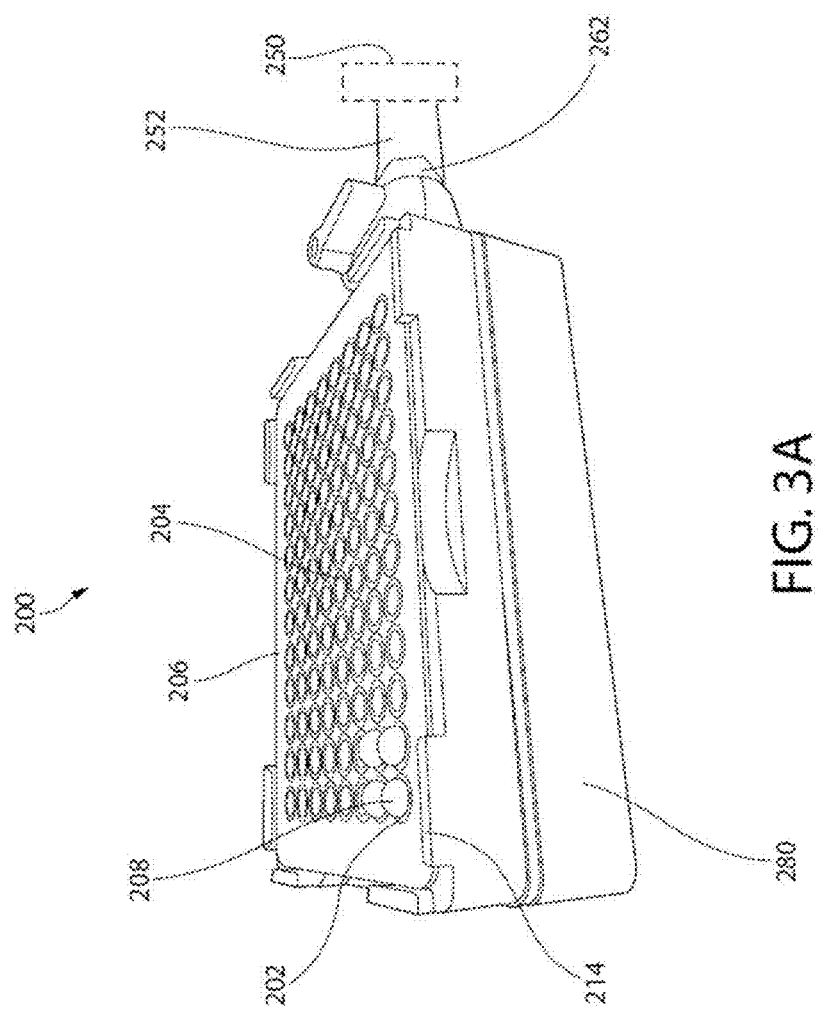

VACUUM MANIFOLD FOR FILTRATION MICROSCOPY

CROSS-REFERENCE TO RELATED APPLICATIONS

This application is a continuation of U.S. non-provisional application Ser. No. 16/394,173, filed on Apr. 25, 2019, which claims priority to U.S. provisional application No. 62/662,370, filed on Apr. 25, 2018, incorporated herein by reference in its entirety.

BACKGROUND OF THE INVENTION

Particle analysis is a growing market that impacts most industrial sectors spanning from healthcare to cements. Particles can span a wide size range from a few nanometers up to several centimeters and need to be analyzed for research, process and quality control purposes.

Optical microscopy is a key technique for conducting particle analysis, offering particle sizing, counting, morphology and visualization based on image analysis. Depending on the sample's optical properties and the microscope's resolution, optical microscopy can be used to analyze particles ranging from a few hundred nanometers up to centimeter scale. Optical microscopy enables key advantages over other particle analysis methods, particularly ensemble-based methods like dynamic or static light scattering, since it offers individual particle analysis and extracting additional information including morphology and potentially optical and spectroscopic properties of the particles.

One modification of optical microscopy used to handle wet dispersions is filtration microscopy, also known as membrane microscopy. In membrane microscopy, a sample containing particles suspended in a solution is filtered through a porous membrane, and particles larger than the pore sizes remain on top of the filter (unfiltered) and are later imaged and analyzed. Membrane microscopy is typically used to assess process stability and screen for impurities. Membrane imaging is used in several industries with applications including but not limited to:

Pharmaceuticals: Filtration microscopy, also known membrane microscopy is the original quality control method for measuring subvisible particles (1 um-100 um) in pharmaceutical injectables. A non-automated version of this microscopy method became the first USP method for lot release (USP 788) recommending the acceptable levels of particulate content in pharmaceutical injectables, including but not limited to small molecule dispersions and biopharmaceuticals. This is a very important step since the presence of undesired particles in pharmaceutical solutions may be correlated to immunogenicity. Filtration microscopy can also be used to characterize adjuvants in vaccines and pharmaceuticals particles used for encapsulation or drug delivery.

Oil and Gas: Membrane microscopy is applied in several applications including analyzing micrometer scale fracking agents and muds to measuring undesired sediment in jet fuels batches.

Aquatic and water quality research: Filtration microscopy can be used to measure algae, plankton and other bacteria and undesired pathogens in water sources.

Chemicals: Filtration microscopy can be used to measure nano or micrometer scaled precipitated chemicals and impurities present in these bottles.

Food and Beverage: Microparticles can be used in encapsulation and characterized via membrane microscopy.

Yet, optical microscopy faces two key challenges for conducting proper analysis on wet dispersions. The first challenge is not confounding the porous membrane texture with the particles being measured. The second challenge is ensuring that the particles are sufficiently dispersed on the membrane such that there is little to no particle stacking so that individual particles can be resolved and analyzed.

Thus, there is a need in the art for a device, system and method that can perform more reliable and accurate optical microscopy analysis on wet dispersions while minimizing the issues with confounding the porous membrane texture with the particles being measured and particle stacking.

SUMMARY OF THE INVENTION

In one embodiment, a vacuum manifold for filtration microscopy includes a manifold top including multiple openings; and a capture membrane positioned above and spaced apart from the manifold top, where the capture membrane is configured to deflect into contact with a surface of the manifold top when a negative pressure is applied to the multiple openings. In one embodiment, multiple opening are each defined by a contacting surface protruding from the manifold top. In one embodiment, the contacting surface protruding from the manifold top is a contacting ring. In one embodiment, the contacting surface protruding from the manifold top includes one or more pins. In one embodiment, the capture membrane further includes hydrophobic rings defining the sample spots. In one embodiment, the hydrophobic rings are positioned directly above the contacting rings. In one embodiment, at least a portion of the contacting rings are positioned directly below sample spots defined by the hydrophobic rings. In one embodiment, the vacuum manifold includes a housing defining a cavity and configured to seat the manifold top, where the cavity is in fluid communication with the multiple openings. In one embodiment, the vacuum manifold includes a vacuum port in fluid communication with the cavity and configured to connect to a vacuum supply. In one embodiment, the multiple openings are 96 openings. In one embodiment, the vacuum manifold includes a drying cassette configured to seat blotting paper and the capture membrane. In one embodiment, the capture membrane comprises pore sizes between about 50 nanometers and 10 microns. In one embodiment, the vacuum manifold is in ANSI 96 well size format. In one embodiment, the capture membrane is a 25 mm or a 47 mm membrane filter. In one embodiment, at least a portion of a surface of the manifold top or capture membrane includes a non-stick coating. In one embodiment, the vacuum manifold includes a pressure control opening configured in the manifold top and separate from the multiple openings. In one embodiment, a space defined by two or more of the rings, the capture membrane and the manifold top is configured to generate a pressure higher than a negative pressure applied to the multiple openings and lower than atmospheric pressure.

In one embodiment, a method for filtration microscopy includes the steps of providing a vacuum manifold including a manifold top having multiple openings, and a capture membrane positioned above and spaced apart from the manifold top; applying sample drops to sample spots on the membrane, the sample spots positioned above the openings; applying a negative pressure to the openings such that the capture membrane contacts a surface of the manifold top and fluid from the plurality of sample drops is suctioned through the capture membrane; and optically imaging particulates on the capture membrane. In one embodiment, the plurality of sample drops includes a biopharmaceutical solution. In one embodiment, the biopharmaceutical solution includes visible particles, subvisible particles and nanometer scale particles. In one embodiment, the particulates include protein aggregates. In one embodiment, the particulates include at least one of polysorbate particles, metallic particles, rubber particles, silicone oil droplets, salt crystals, cellulose and sucrose particles. In one embodiment, the sample drops include a viscosity between 1 cP and 200 cP. In one embodiment, the sample drops include a tag to perform at least one of fluorescent identification and protein activity monitoring. In one embodiment, the method includes the step of applying a drop comprising a tag after the step of applying a negative pressure to perform at least one of fluorescent identification and protein activity monitoring. In one embodiment, the method includes the step of generating a data visualization image based on the imaging and indicative of dispersion of the particulates. In one embodiment, the capture membrane further includes multiple hydrophobic rings defining the multiple sample spots, and the step of optically imaging includes matching an imaging device field of view to the size and shape of a single hydrophobic ring for whole well imaging.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIGS. 3A-3B are images of vacuum manifold assemblies according to various embodiments. FIG. 3A is a perspective view of an assembled vacuum manifold, without the drying cassette; FIG. 3B is a perspective view of unassembled vacuum manifold components.

DETAILED DESCRIPTION OF THE INVENTION

Figure 1A:
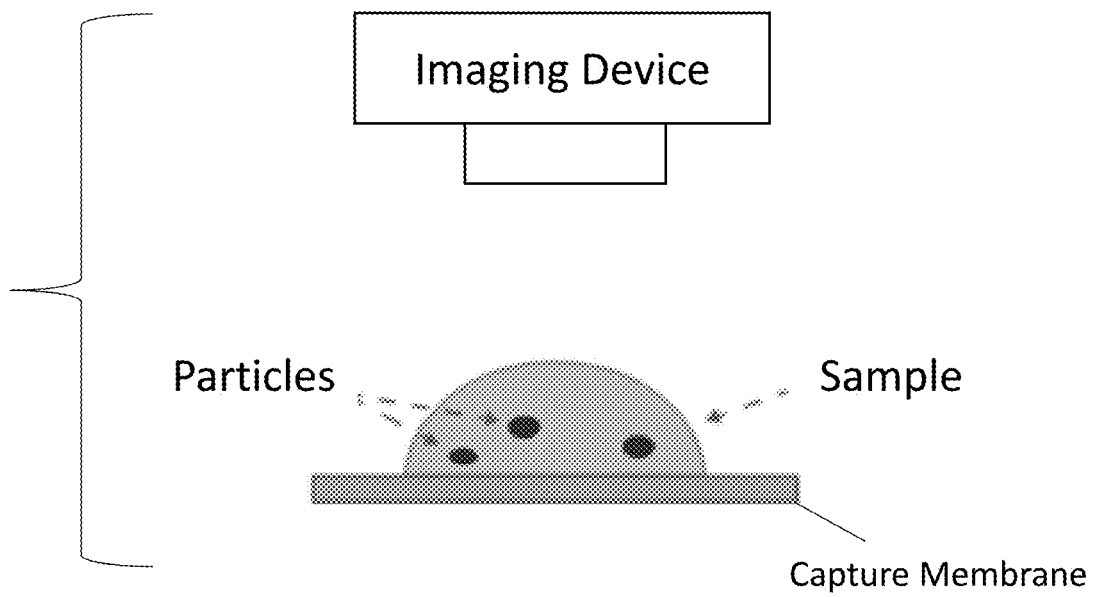
FIGS. 1A and 1B are diagrams of a sample (pre-vacuum and during vacuum respectively) containing particulates on a capture membrane according to one embodiment.

It is to be understood that the figures and descriptions of the present invention have been simplified to illustrate elements that are relevant for a clearer comprehension of the present invention, while eliminating, for the purpose of clarity, many other elements found in systems and methods of optical microscopy. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a device, system and method for filtration microscopy.

Figure 1B:
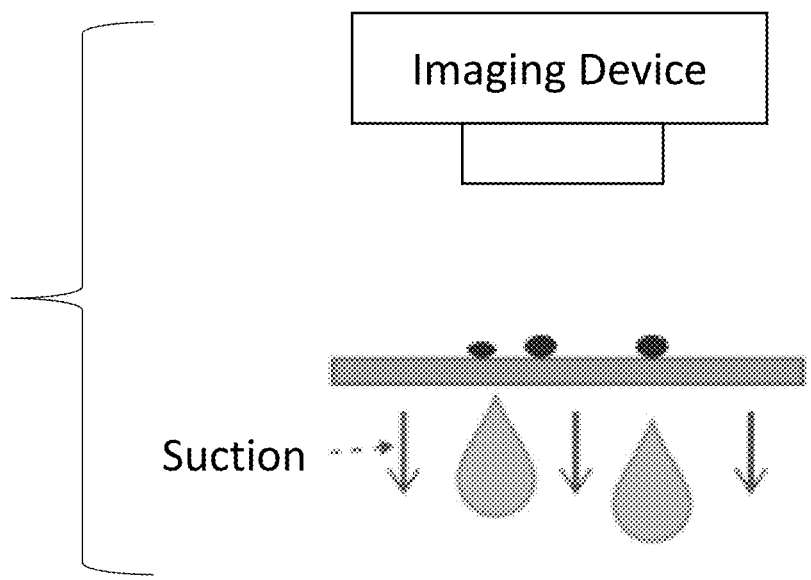

Embodiments described herein include a filtration manifold assembly for filtration microscopy that ensures laminar flow to reduce particle stacking and produce better quality particle analysis, further removing the undesired post filtrate at the bottom of the membrane to improve analysis. The vacuum manifold is an assembly that enables highly uniform spatial distribution of particles present in liquid dispersions onto a capture membrane for improved particle analysis, as illustrated in FIGS. 1A and 1B. In order to get accurate particle sizes and counts, it is advantageous that particles from the liquid sample are deposited on the capture membrane in such a way as to minimize particle overlap. Particles that are touching or overlapping with each other could be counted as one, larger particle, rather than two smaller ones. There are two important considerations. First, it's best to maximize the given membrane area available so that particles are less likely to be randomly placed in proximity with each other. It would be less optimal to guide the flow of liquid through a small region of the available membrane so that all of the particles are concentrated into this smaller region. This would increase the probability of particle overlap. Second, the flow rate of the liquid through the membrane will aid the separation of the particles. If a solution containing particles were to be placed on the membrane and allowed to sit for a long period of time, particles that are less dense than the liquid will sediment onto the membrane. Their positions on the membrane will be random. Instead, if the fluid is driven through the membrane with a pressure differential and allowed to flow through the membrane, particles that have already landed on the membrane will block the membrane pores underneath them. In these conditions of laminar flow, the fluid will flow around these sedimented particles, directing other particles away from them. In this way, the particles are less likely to touch each other.

Figure 2A:
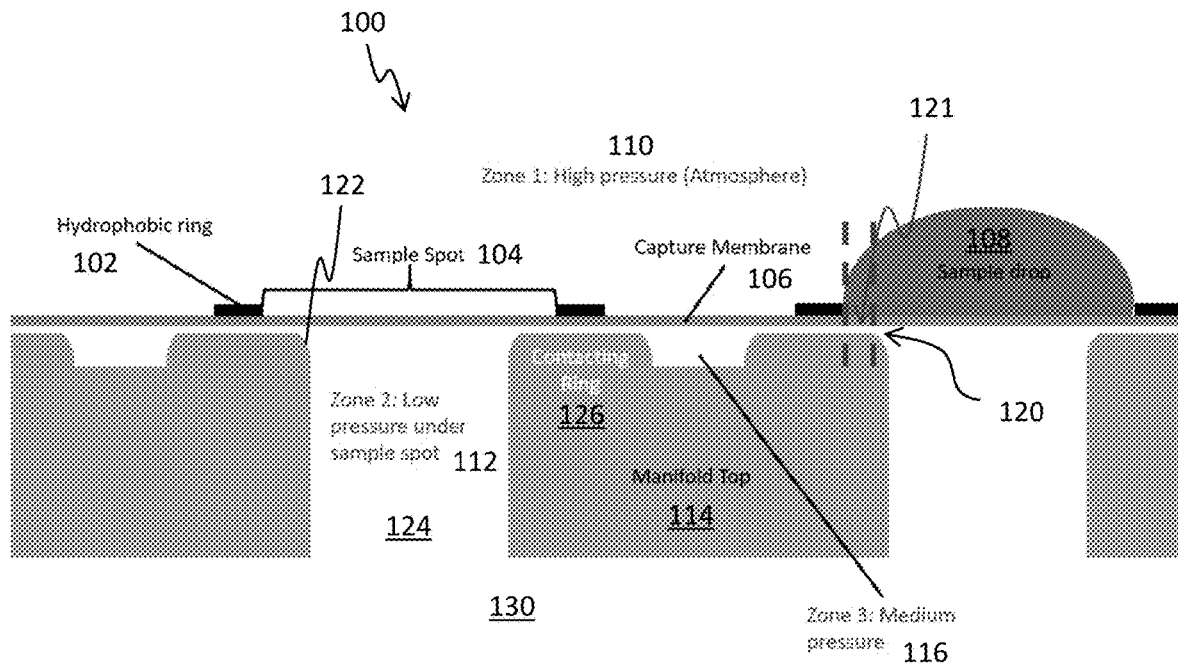
FIGS. 2A and 2B are diagrams of a cross-sectional view of a manifold top and capture membrane (pre-vacuum and during vacuum respectively) according to one embodiment.
Figure 2B:
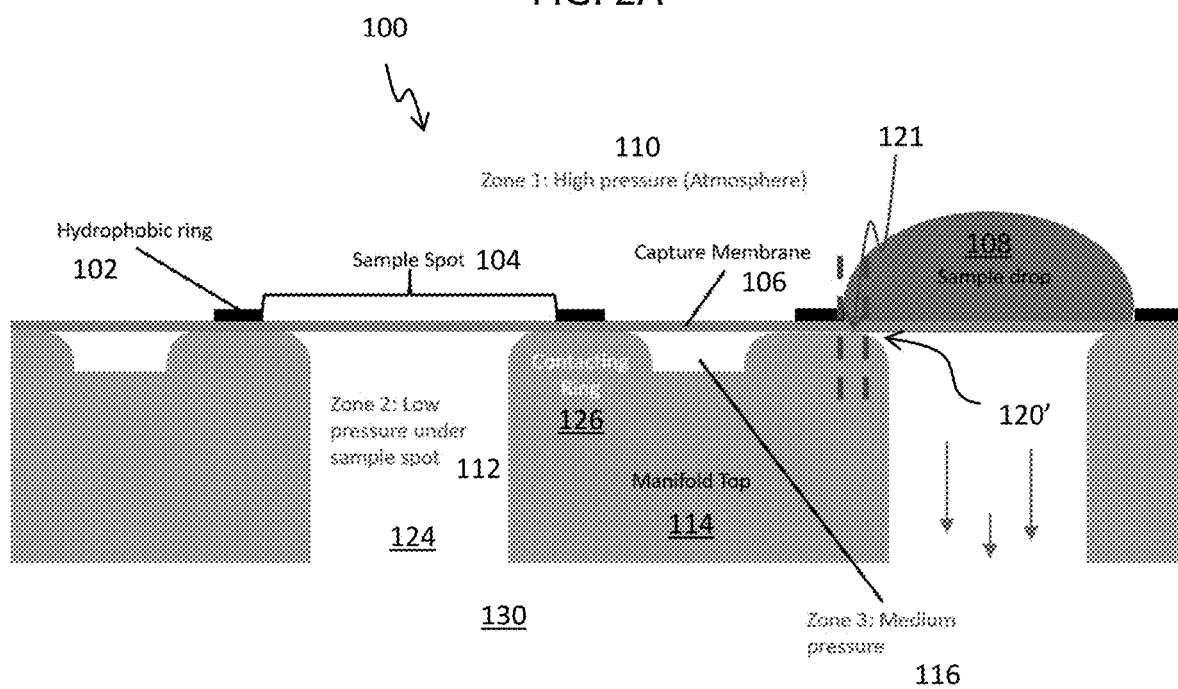

With reference now to FIGS. 2A and 2B, a cross-sectional view of vacuum manifold 100 illustrating a manifold top 114 and capture membrane 106 is shown before (FIG. 2A) and during (FIG. 2B) the application of vacuum according to one embodiment. The capture membrane 106 has sample spots 104 defined by hydrophobic rings 102. A sample drop 108 is shown as well, contained within the hydrophobic ring 102 that defines a sample spot 104. During vacuuming, the sample drop 108 is pulled down through the membrane 106 and then through the holes of the manifold top 114 and into the manifold cavity 130. In one embodiment, there are 96 sample spots 104. Alternate embodiments may include other standard configurations, for example 96, 24, 12 and 6 sample spots. Each of the sample spot 104 aligns with an opening 124 in the manifold top 114. Three distinct pressure zones are present, including zone 1 or high pressure (atmosphere) 110, zone 2 or low pressure 112 directly under the sample spot 104, and zone 3 or medium pressure 116 between contacting rings 126. The geometry of the manifold top 114 includes contacting rings 126 that protrude from the top of the manifold top to align with the hydrophobic rings 102. A pressure control hole (see e.g. FIG. 3D) which in one embodiment has an adjustable aperture can be included to fine-tune pressure levels. The pressure control hole controls the pressure in the medium pressure zone which also aids in reducing noise that otherwise occurs during vacuum.

The contacting rings 126 contact the membrane 106 within the samples spot 104 area and contact region 121 when vacuum is applied. This contact disrupts the surface tension, allowing the sample drop 108 to flow through the membrane 106. The contact region 121 in one embodiment can be along the perimeter of the sample spot 104 area. The design of the manifold top 114 is such that at rest (FIG. 2A), the sample spot 104 of the membrane 106 does not touch the contacting rings 126 beneath the membrane 106, since there is a gap 120. However, the ring 126 is close enough to the membrane 106 so that that when a threshold vacuum pressure is applied (FIG. 2B), the deflection of the membrane 106 initiates contact 120' between the membrane 106 and the contacting rings 126 at the contact region 121. This contact 120' between the membrane 106 and the contacting rings 126 initiates flow through the membrane 106 by breaking surface tension capillary forces. In one embodiment, an edge 122 of the contacting ring is angled or curves down into the hole 124 to facilitate initiation of flow through the membrane 106 and into the hole 124. In one embodiment, the gap 120 is about 0.1 mm. Generally, the gap 120 should be far enough away so that the weight of the liquid doesn't deflect the membrane 106 and initiate contact with the contacting rings 126 before the threshold vacuum pressure is reached. Otherwise, if the gap 120 is too big, the membrane 106 will be too far away to contact the contacting rings 126 during vacuuming or the membrane 106 may be stretched too far and will become deformed. In one embodiment, between 10 and 50 kPa of vacuum pressure is applied during vacuum cycles.

Figure 3B:
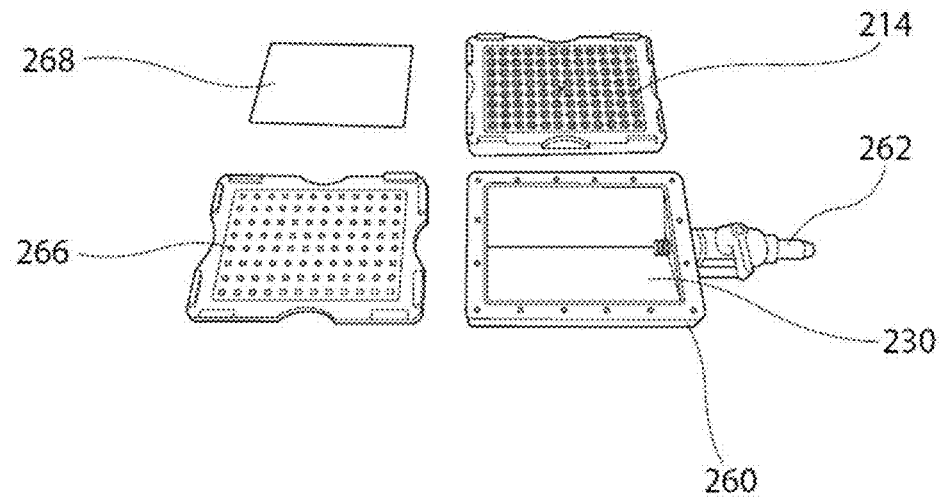
Figure 3C:
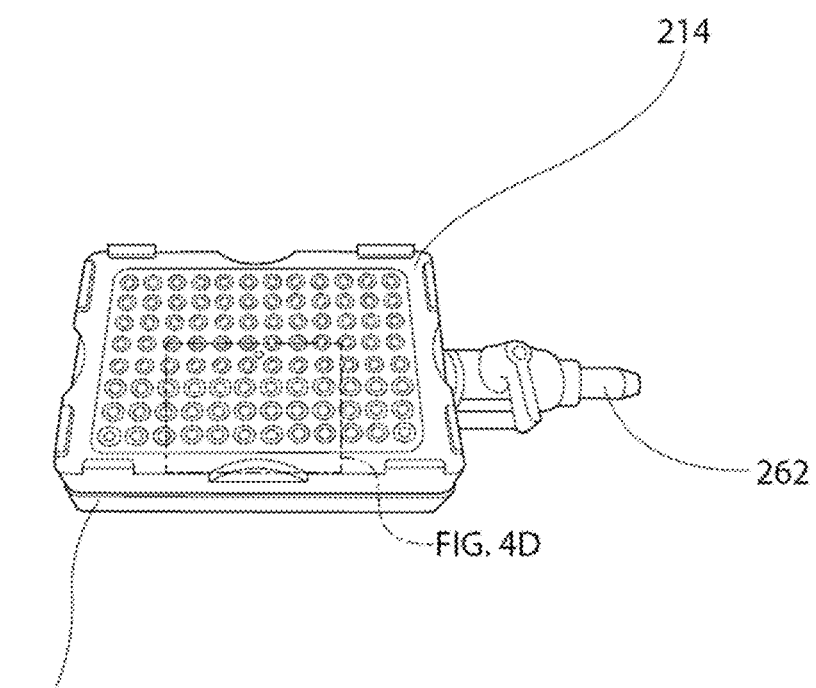
FIG. 3C is a perspective view of a vacuum of an assembled vacuum manifold without the capture membrane.
Figure 3D:
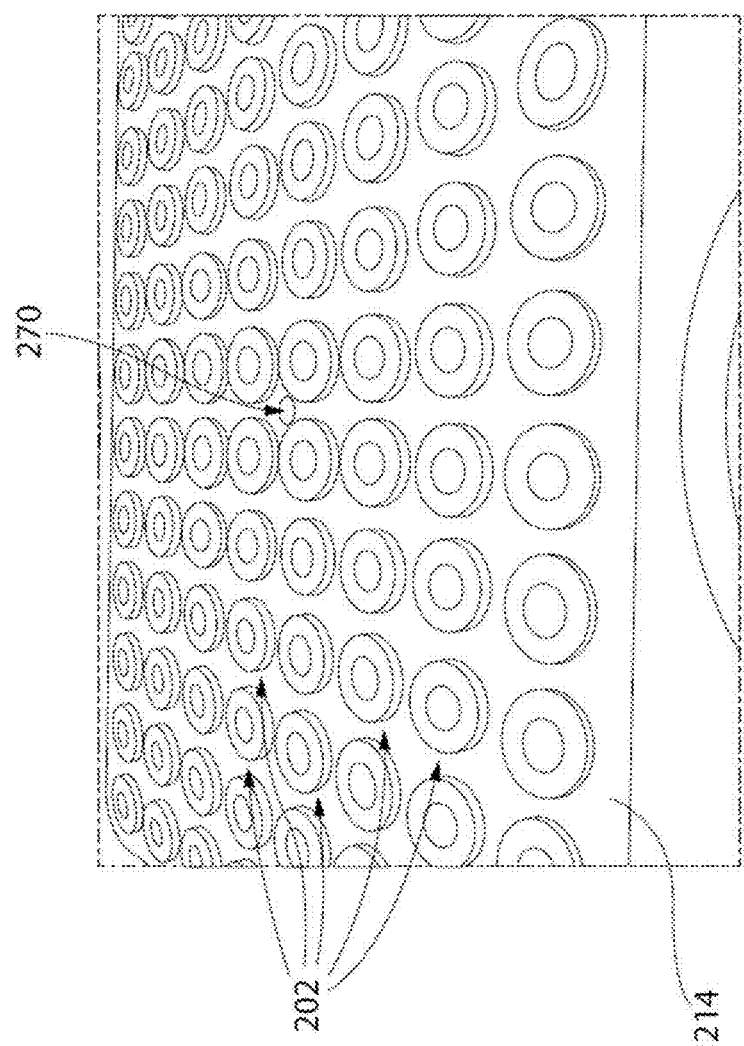
FIG. 3D is a magnified view of a manifold top.
Figure 3E:
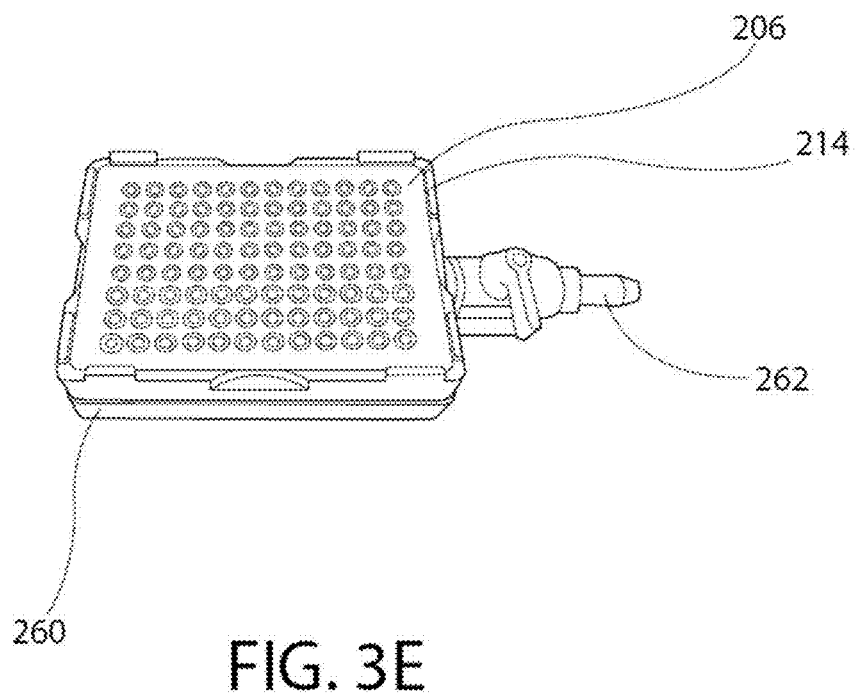
FIG. 3E is a perspective view of an assembled vacuum manifold.
Figure 3F:
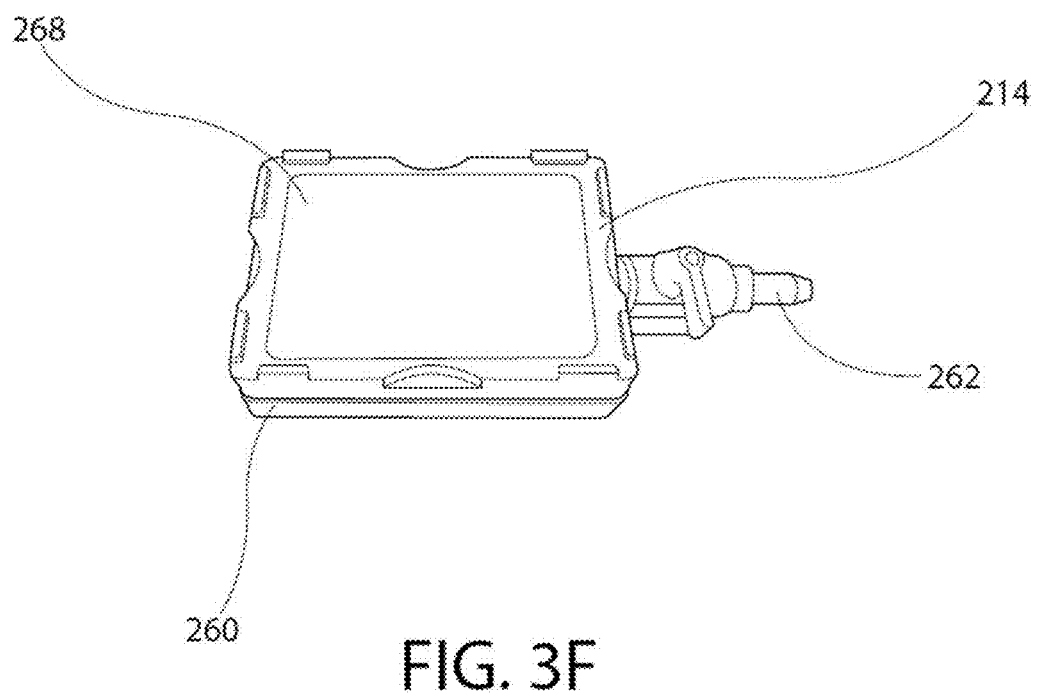
FIG. 3F is a perspective view of a vacuum manifold drying cassette and blotting paper.

In one embodiment, each of the 96 sample spots 104 on the capture membrane 106 is above a hole in the manifold top 114. Each of the 96 holes allows the vacuum pressure within the manifold cavity 130 to draw liquid through the corresponding sample spot 104 above the hole 124. Importantly, the contacting ring 126 surrounds each hole 124 in the manifold top 114 and contacts the sample spot 104 region of the capture membrane 106 from the bottom. Contacting the top surface of the contact ring 126 with the sample spot 104 is what breaks the surface tension that otherwise opposes flow of the sample drop 108 through the capture membrane 106. In one embodiment, there are 96 contacting rings 126 that match geometrically with the 96 sample spots 104 on the capture membrane 106. With reference now to the vacuum manifold assembly 200 shown in FIG. 3A, in one embodiment, the vacuum manifold assembly 200 includes an external housing 280 that seats a manifold top 214. The manifold top 214 seats a capture membrane 206 which in one embodiment has 96 hydrophobic rings 202 defining 96 sample spots 204 for containing sample drops 208. A vacuum source 250 connects to a cavity below the membrane 206 via a vacuum connection port 262 and tubing 252. With reference now to FIG. 3B, blotting paper 268, drying cassette 266, manifold top 214 and manifold bottom 260 components are shown. The manifold bottom 260 includes a cavity 230 connected to and in fluid communication with a vacuum connection port 262, for connecting to tubing and a vacuum source. As shown in FIG. 3C, the manifold top 214 and bottom 260 are assembled and ready to accept a capture membrane for sample processing. As shown in FIG. 3D, a pressure hole 270 can be positioned in the manifold top 214 to regulate system pressure. In one embodiment, the pressure hole 270 can have an adjustable opening that opens and closes to adjust internal system pressure, and can also be automated based on a pressure feedback measurement. Contacting rings 202 are also shown protruding from the manifold top 214. As shown in FIG. 3E, the manifold top 214 and bottom 260 are assembled with a capture membrane 206 placed in the pocket of the manifold top 214. With reference to FIG. 3F, the manifold top 214, bottom 260, drying cassette and blotting paper 268 are assembled. This configuration is ready to accept a capture membrane for drying the plate bottom. In one embodiment, membranes can be configured to process from 1 ul of sample to 100 ml of sample.

Embodiments of the vacuum manifold can be customized or adjusted for different filter sizes, shapes and characteristics. For example, in one embodiment, the vacuum manifold is a 96 well filter plate in ANSI format. In one embodiment, the vacuum manifold is a circular shaped filter, 5 mm to 10 cm in diameter. In one embodiment, the pore sizes in the membrane are between 20 nm and 10 um. In one embodiment, the pore sizes in the membrane are between 50 nm and 10 um. In one embodiment, the pore sizes in the membrane are about 440 nm. In one embodiment, different membrane materials and coatings are utilized, such as, pvp and peg, chrome, gold. In one embodiment, the membrane material is a polymeric, ceramic or metallic material. In one embodiment, a polymeric membrane material is a polycarbonate, polyethylene, polypropylene or polytetrafluyoroethylene material. In one embodiment, a metal membrane material is a chrome, gold, copper or silver material. In one embodiment, a ceramic membrane material includes glass fiber.

There are several important advantages to the embodiments described above, explained in further detail below.

Breaking surface tension or capillary forces:

There are two problems caused by surface tension or capillary forces when pulling a liquid sample through the membrane. First (according to the Young-Laplace theory), aqueous liquid, when placed on the surface of the hydrophilic membrane will spread across the surface and enter the pores of the membrane. In one embodiment, a polycarbonate track etched membrane is used. The pores of this membrane are well defined, and pass through the membrane in the shape of a cylinder. The corners of the cylinder have sharp, roughly 90 degree corners. This geometry can often lead to a case where liquid enters the pores until it reaches the end of the pore at which point a meniscus develops. A pressure differential that would continue to drive the fluid through the membrane will be opposed by the capillary pressure caused by the interfacial forces at the point of the meniscus. Instances have been observed where increasing the pressure differential to drive the fluid through the membrane is opposed so strongly that the membrane deforms before flow can be induced.

These capillary forces can be overcome by placing a membrane contacting material in contact with the bottom of the membrane. This material will change the local geometry, disrupt the meniscus and allow fluid to flow once more. Flow through some of the pores will cause liquid to spread across the bottom of the membrane and contact neighboring blocked pores, disrupting their meniscuses and eventually allowing flow through the whole area of the capture membrane sample spot.

This membrane contacting material solves the problem created by the capillary forces but can also, on occasion cause the opposite problem—using a membrane contacting material can cause liquid to pass through the membrane even without applying a pressure differential. In other words, samples can "leak" through the membrane prematurely, before the vacuum is applied. This unwanted flow is not controlled and causes sample variation due to its sporadic nature. It is therefore desirous in one embodiment to only apply the contacting material at the moment when the vacuum pressure differential is applied so that the fluid flow is controlled and happens when intended.

The contacting rings contacts the membrane within the samples spot when vacuum is applied, disrupts the surface tension and allows the sample to flow through the membrane. For avoiding premature sample flow, the design of the manifold top is such that at rest, the membrane does not touch the contacting rings beneath the membrane—there is a gap. However, the ring is close enough to the membrane so that when vacuum pressure is applied, the deflection of the membrane initiates contact between the membrane and the contacting rings. This contact initiates flow through the membrane.

Sample Isolation:

It is important, when conducting analytical tests, not to contaminate one sample with another. Embodiments described herein are such that many samples can be run in parallel. It's therefore important to prevent samples within a run from intermingling and also important to prevent samples between runs from intermingling. Samples within the same run are prevented from intermingling above the membrane because they are contained within discrete sample spots defined by the hydrophobic rings. However, underneath the membrane, samples are in contact with the manifold and, if the manifold is not designed properly, these samples can spread across the bottom of the membrane. If the liquid does so, it can reach another sample spot and possibly contaminate it, or block the pores from the bottom. Between runs, sample droplets that remain on the manifold can then make contact with the subsequent capture membrane that is placed on the manifold. These droplets can contaminate the sample, discolor the membrane which is concerning to users, and they can even induce premature flow of the sample due to the breaking of surface tension under the membrane.

For sample isolation during a run, the rings protrude from the surface and define a small contact region between the capture membrane and the manifold material itself. The rings are separated from each other and define a small contact region. During vacuuming, the sample may be in contact with the sample ring but will not travel along the manifold to other contact rings. In this way, each sample spot is isolated from the rest. Various geometries of the hole in the manifold top can be used so that droplets don't get trapped in the hole or, if they are trapped in the hole they are located in a position to minimize the chance of the droplet touching the subsequent capture membrane from the bottom.

The sample rings must have a large enough radius so that when the membrane deflects, it does not warp against a small, "sharp" ring. To maximize utilization of the sample spot area, the rings are located such that they make contact within the region of the sample spot. However, the contact region should not take up too much of the sample spot. Contacted regions will block the membrane pores and either reduce or prevent flow. This reduces the usable area of the membrane. In one embodiment, part of the ring contact ring resides outside the perimeter of the sample spot.

Drying the Back of the Membrane for Imaging:

After samples are processed through the capture membrane it is imaged. The membrane image can be dramatically affected by droplets of water clinging to the bottom of the membrane. This adversely affects the analytical technique. Furthermore, liquid droplets that remain on the bottom of the membrane may also into the analytical instrument or cause cross-contamination upon user handling. These droplets should be removed efficiently.

To solve this problem, a drying cassette as disclosed above was designed. This cassette is used just after a sample has been processed through the capture membrane using the vacuum manifold. The drying cassette has a recessed pocket to hold a capture membrane. It also has a mechanically defined region that holds a blotting paper positioned to be in contact with the bottom of the capture membrane. Beneath this blotting paper, there are 96 holes in the drying cassette that are aligned with the sample spots on the capture membrane. Furthermore, the drying cassette is designed to nest on top of the vacuum manifold top. When the whole system is assembled (from top to bottom: the capture membrane, the blotting paper, the drying cassette and the manifold top), a small pressure differential is generated which pushes the capture membrane against the blotting paper and causes a small air flow. Both the induced contact and the air flow causes efficient drying of the bottom of the membrane. The system is simple to operate and the blotting paper, which is cut to match the proper pocket in the drying cassette, can simply be discarded.

Avoiding Loud Noises:

Air travelling between a deformable membrane and another surface can generate loud noises that are unpleasant and disruptive. The nature of the seal between the capture membrane and the contacting ring is such that these loud noises can be generated. These loud noises should be reduced or eliminated if possible.

To address this issue, a pressure control hole is implemented into the manifold top. This hole generates a cavity of lower pressure in the space underneath the contacting membrane but outside the contacting rings. The hole therefore adds another zone of pressure to the system. With reference back to FIGS. 2A and 2B, the three distinct pressure zones are Zone 1: high pressure (atmospheric pressure above the plate); Zone 2: low pressure underneath the sample spot; and Zone 3: medium pressure between the manifold top and the region of the capture membrane outside the contacting ring. This medium zone of pressure aids the seal between the capture membrane and also reduces unwanted, sound-generating air flow between the membrane and the manifold.

Sticky Residue:

When samples are processed, they can dry quickly between the capture membrane and the manifold. Depending on the contents of the sample, a sticky residue may be left behind and cause a bond between the membrane and manifold. Such a bond can rip the membrane when it is removed from the manifold.

To solve this issue, a variety of conventional non-stick coatings can be applied to the manifold to reduce or prevent this effect.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Figure 4:
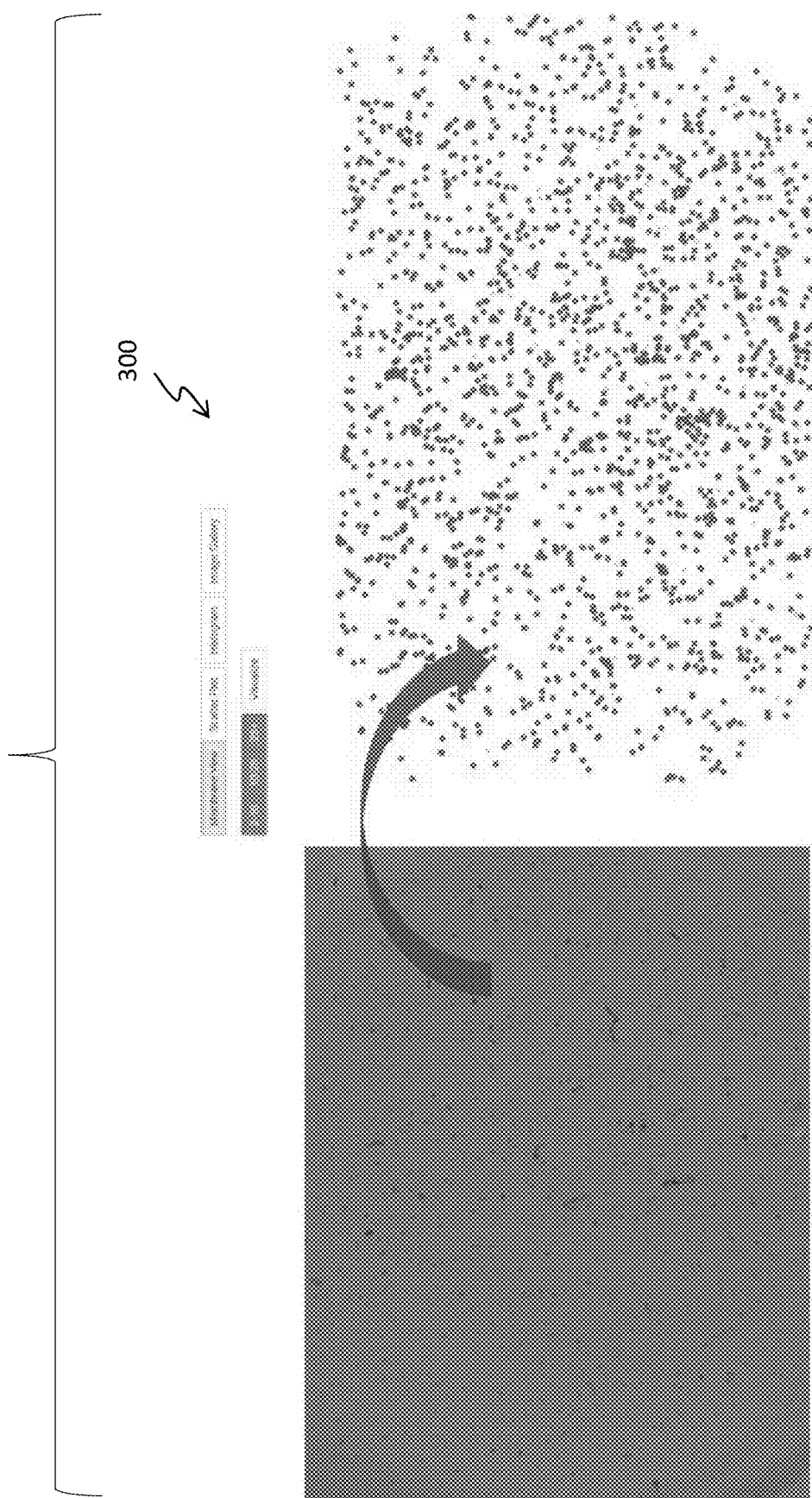
FIG. 4 is an image of a data visualization tool according to one embodiment.

With reference now to FIG. 4, a data visualization tool 200 can be used to help ensure that particles are being nicely dispersed on the membrane. In one embodiment, the data visualization tool 300 shows an actual image of the particles and the capture membrane (left), next to a graphical depiction of every particle (right) represented by a little ball graphic. Properties of the particle such as size and characteristics can be represented by the size, color and/or pattern of the ball graphic. Advantageously, this data visualization tool 300 allows the user to verify that particles are nicely spaced out across the membrane, indicative of the reliability of the data that will be obtained.

Figure 5:
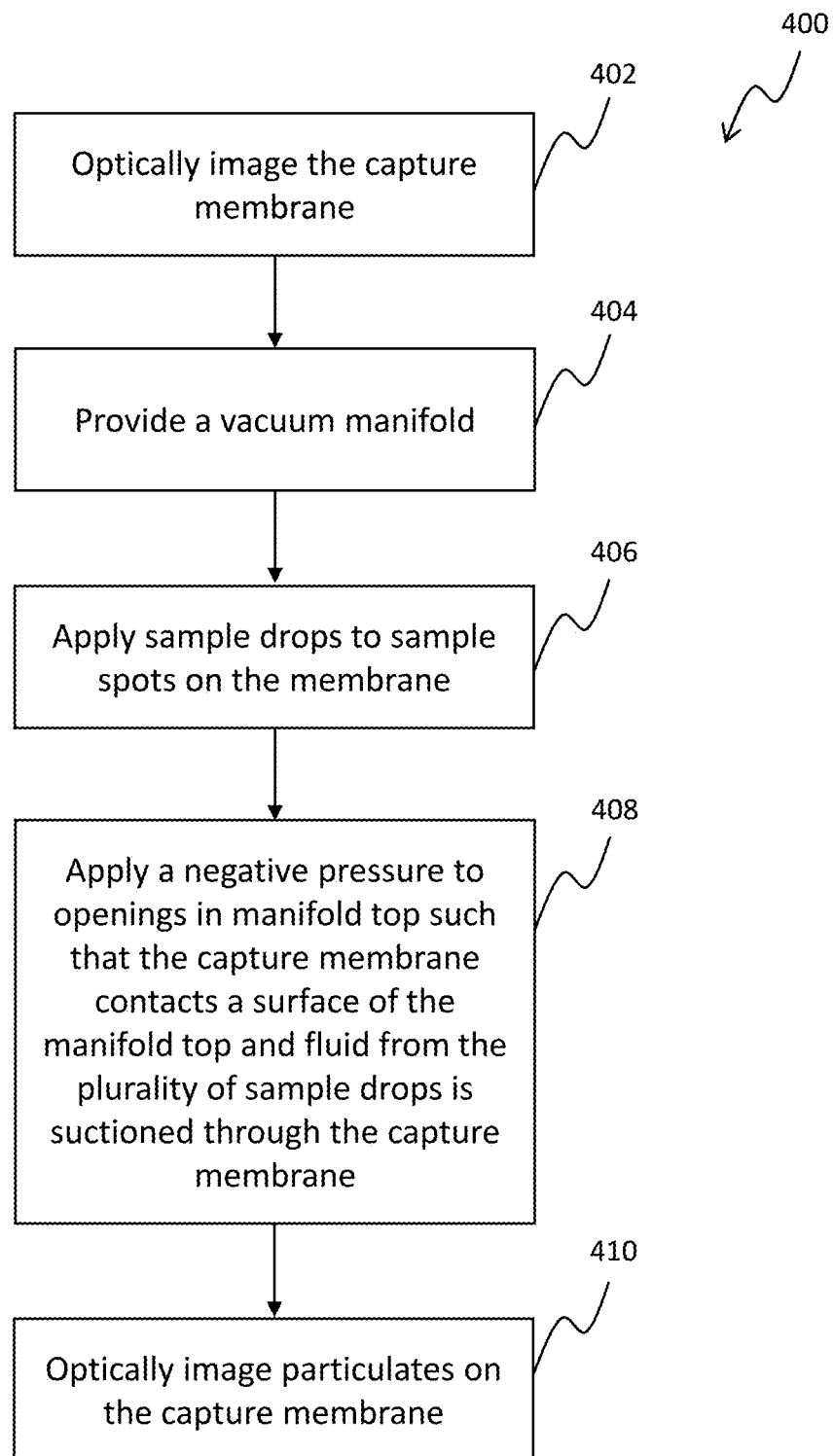
FIG. 5 is a flow chart of a method for filtration microscopy according to one embodiment.
Figure 6A:
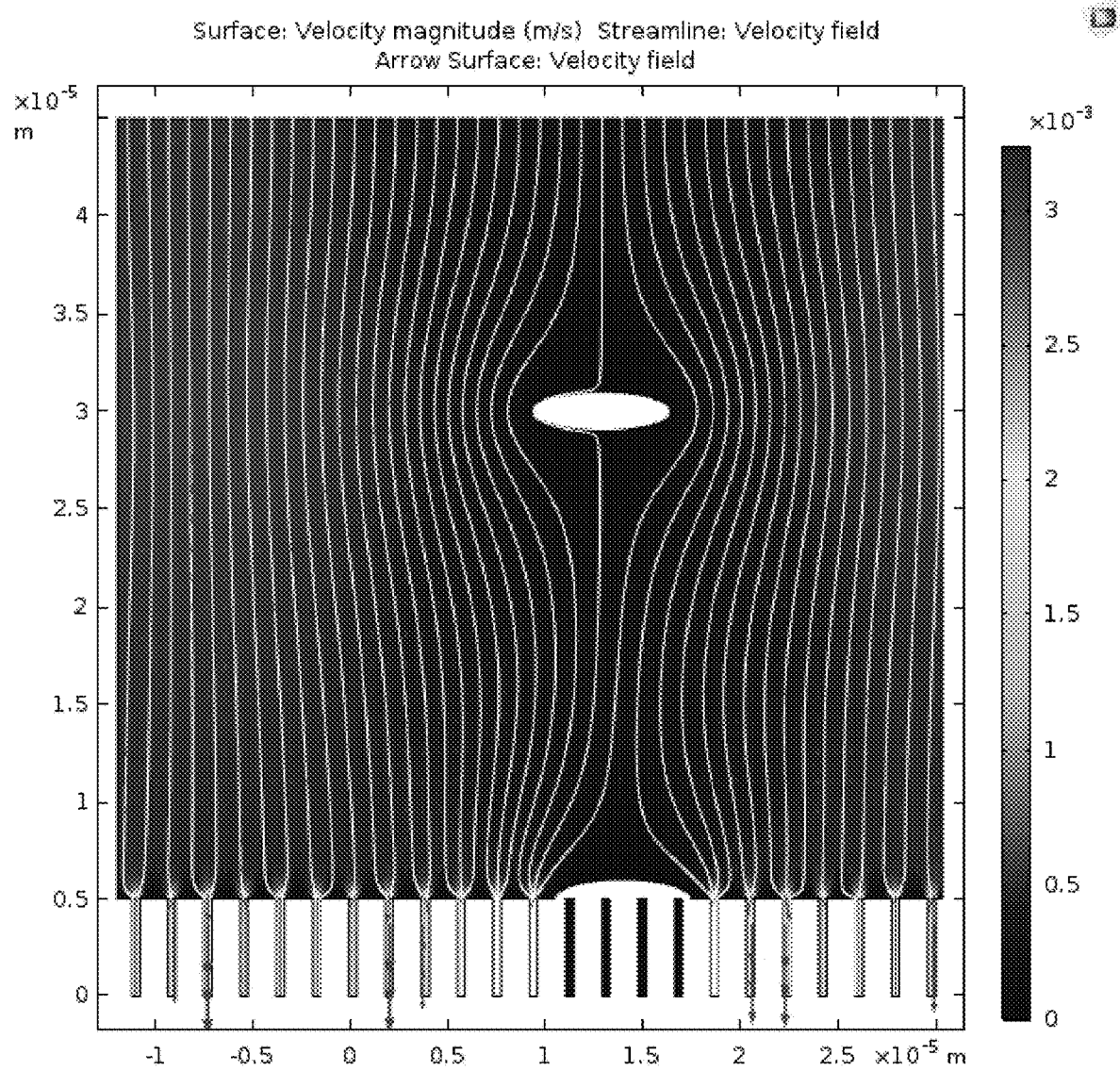
FIGS. 6A-6J illustrate a laminar flow fluid mechanics simulation progression and a magnified view 6K according to one embodiment.
Figure 6B:
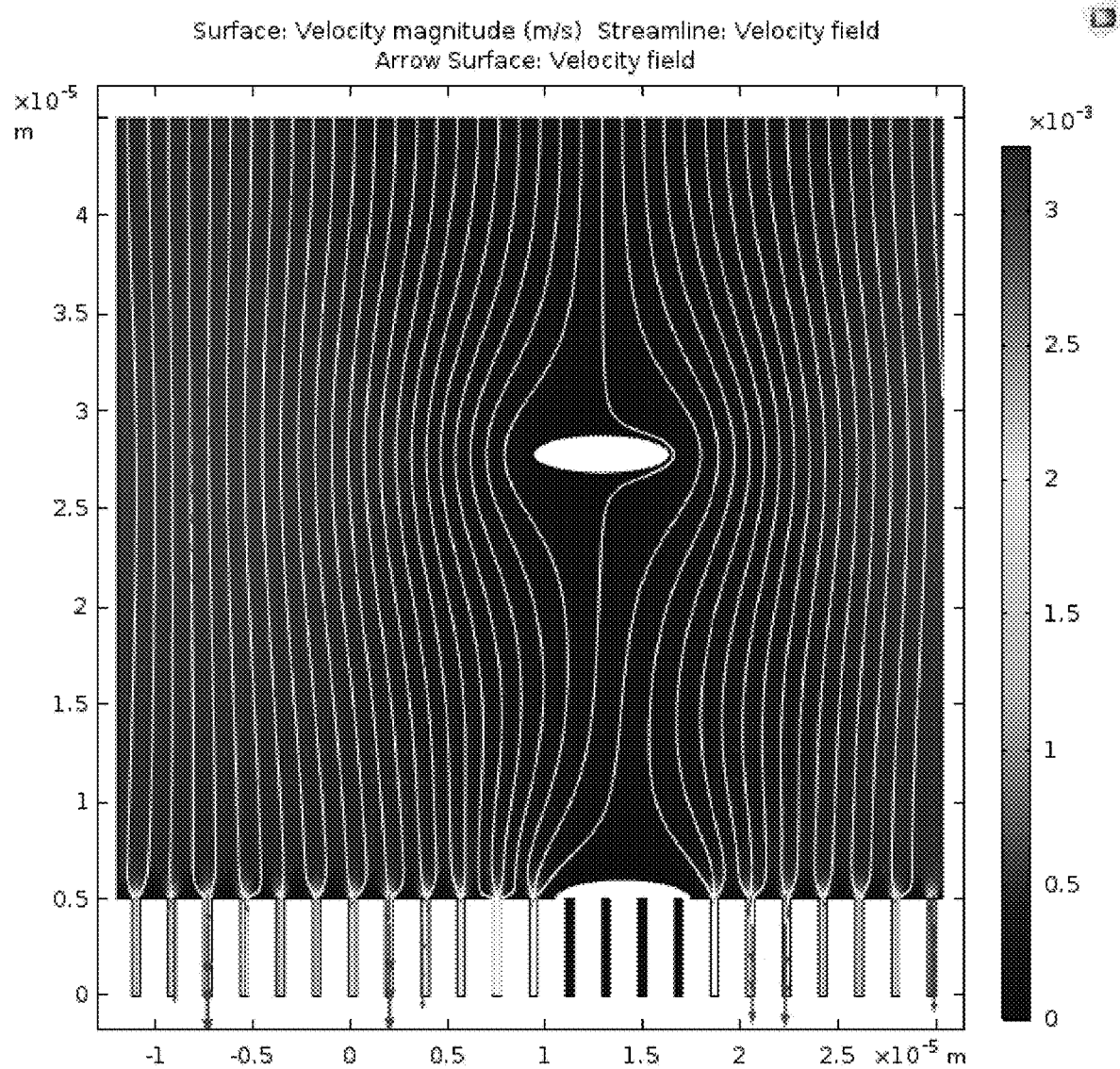
Figure 6C:
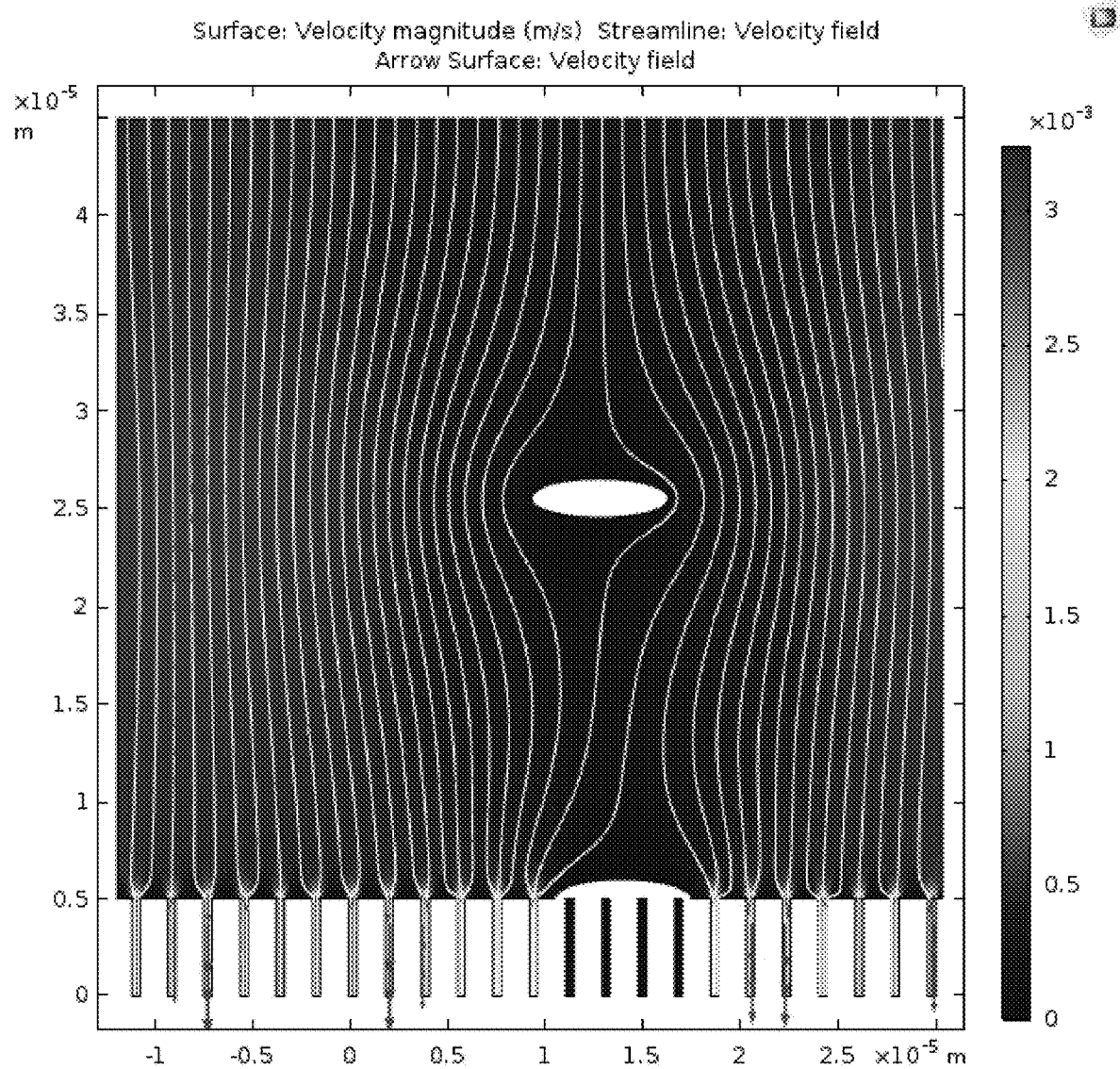
Figure 6D:
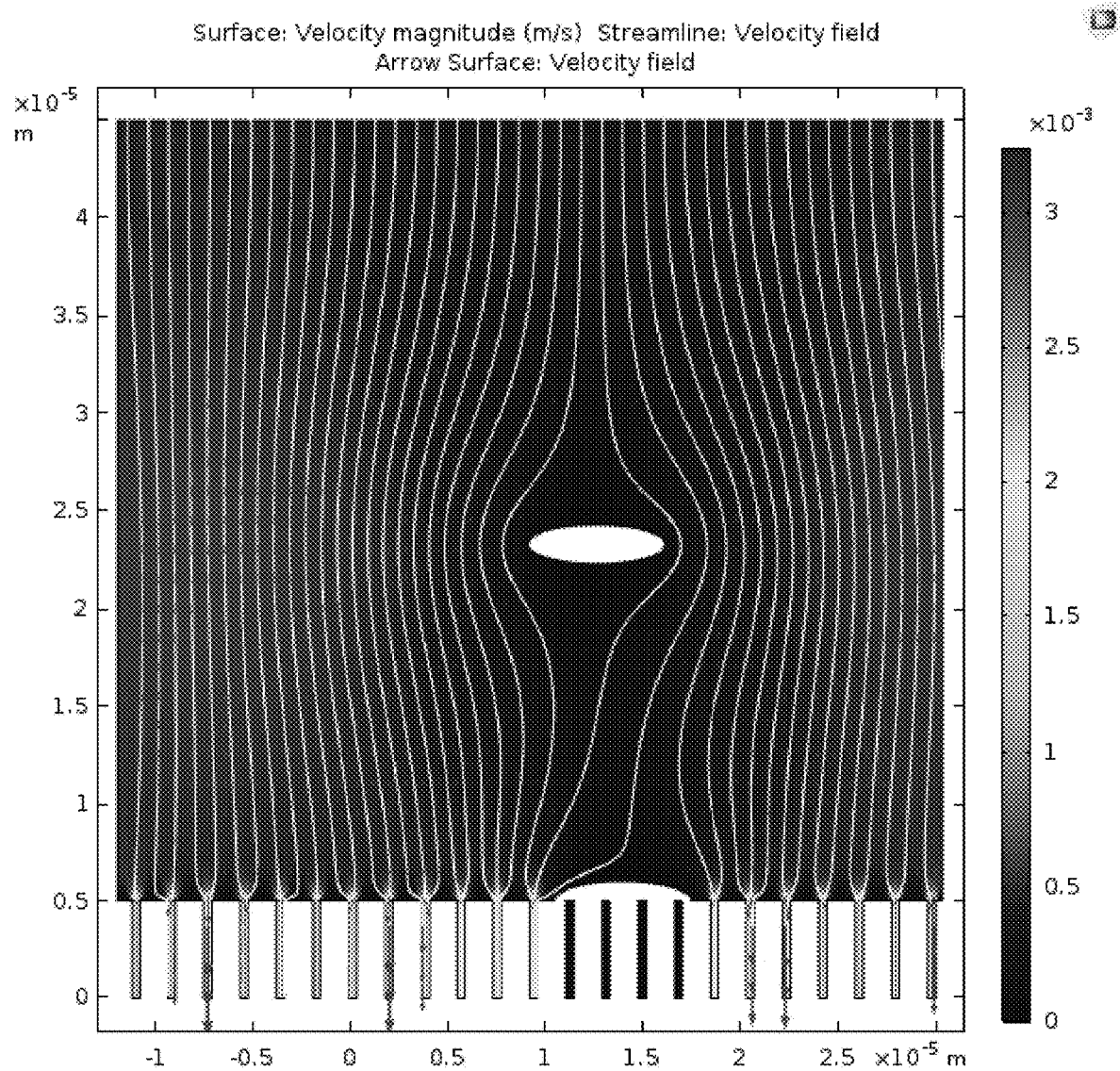
Figure 6E:
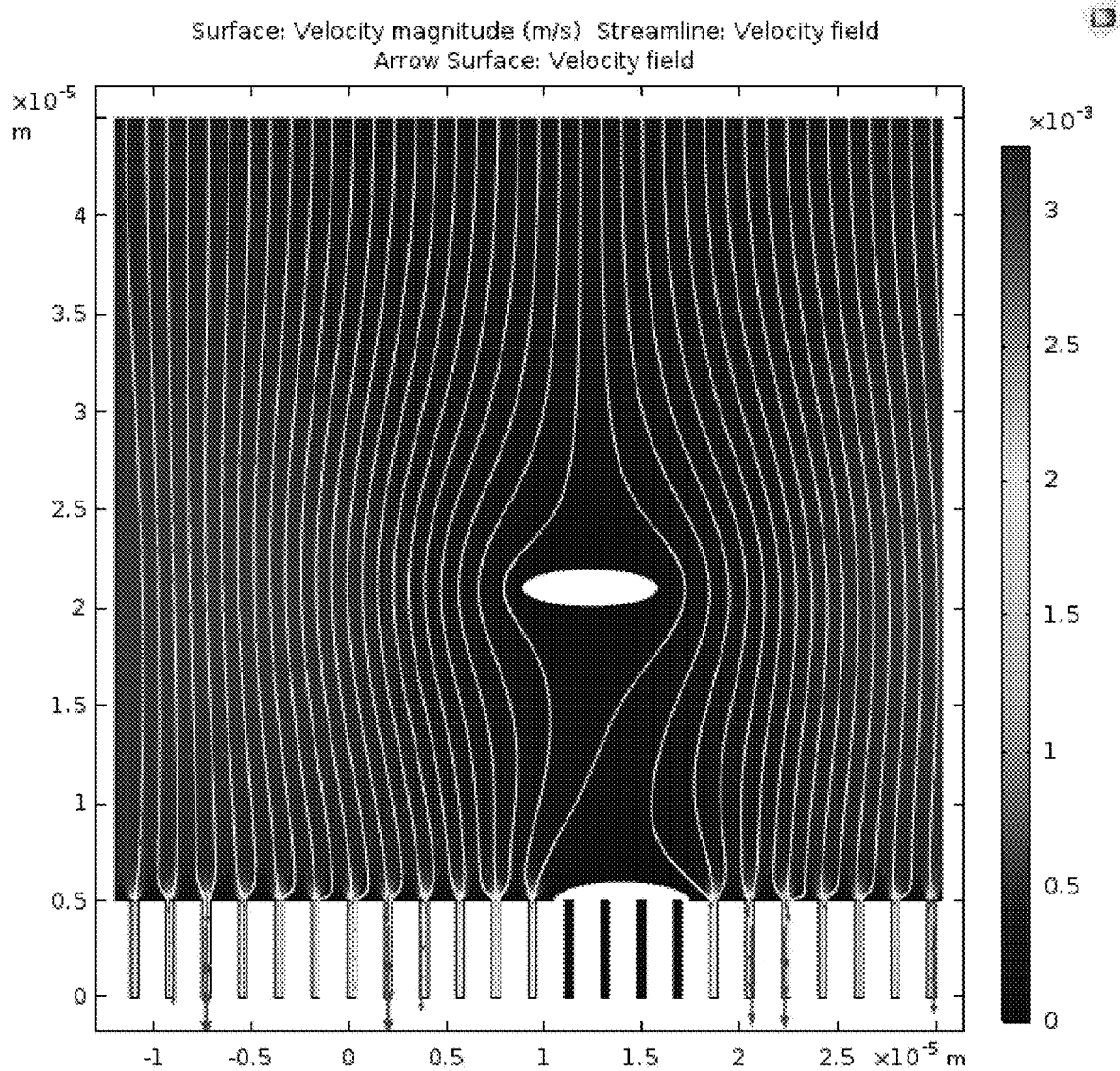
Figure 6F:
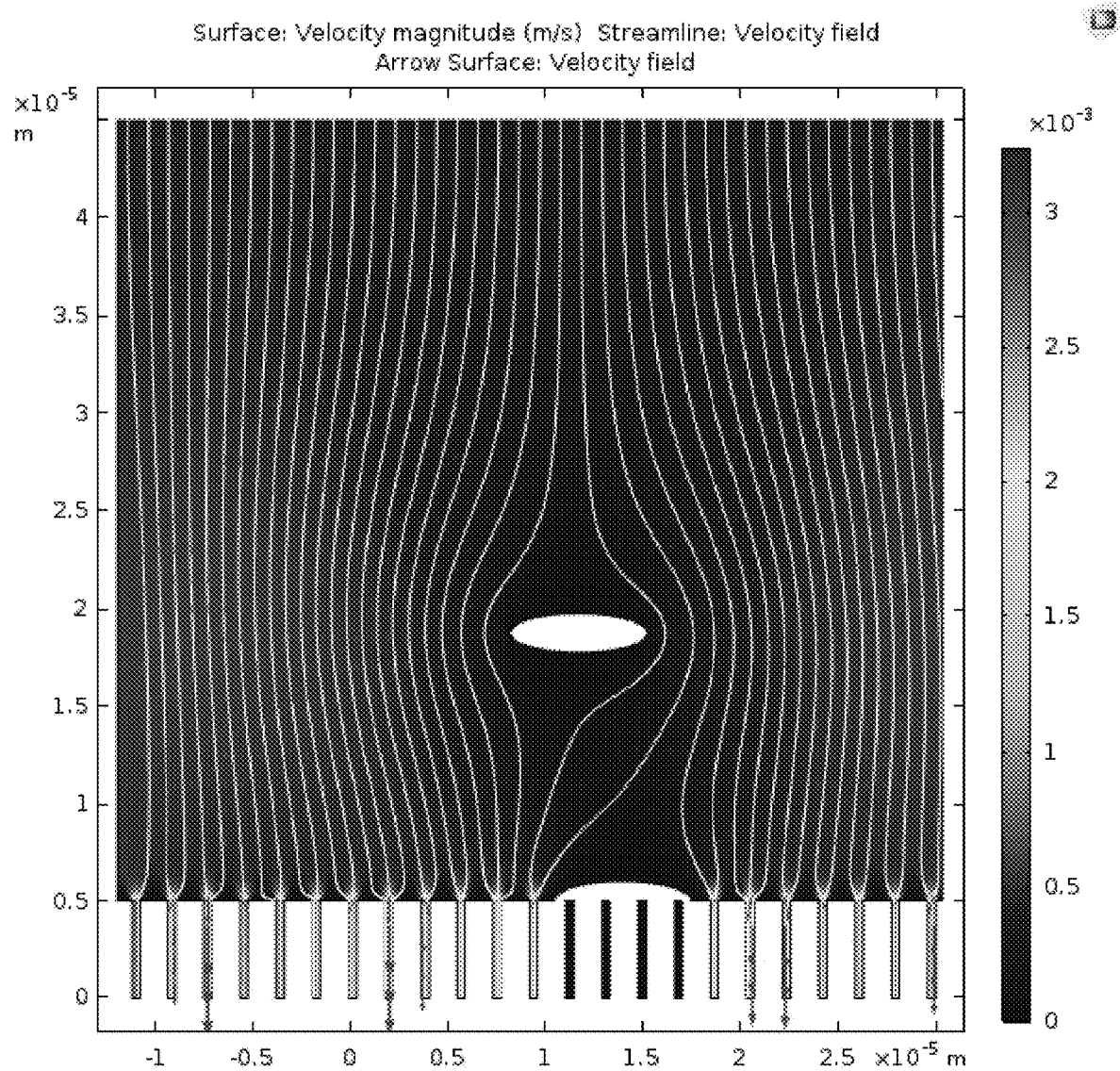
Figure 6G:
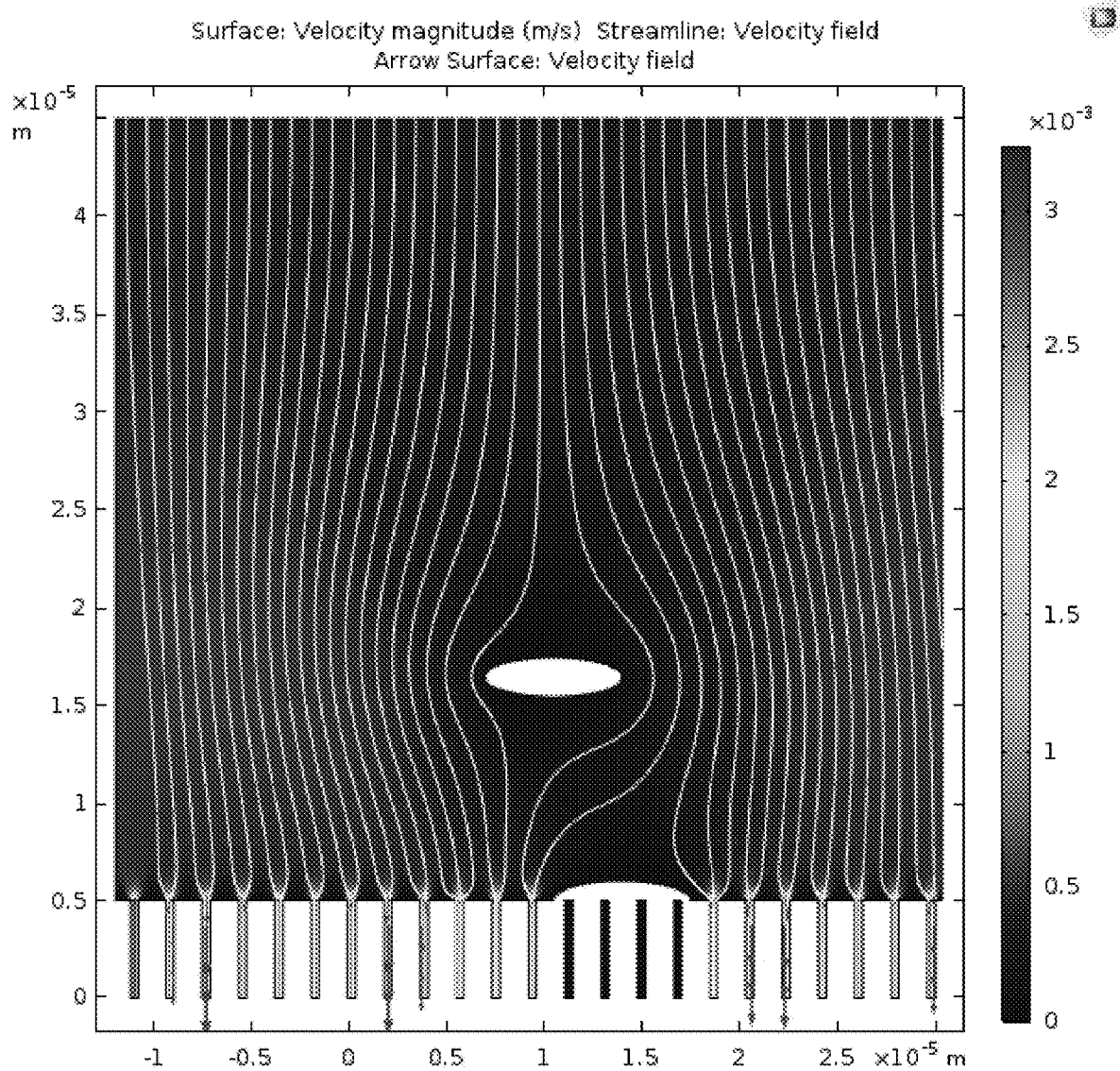
Figure 6H:
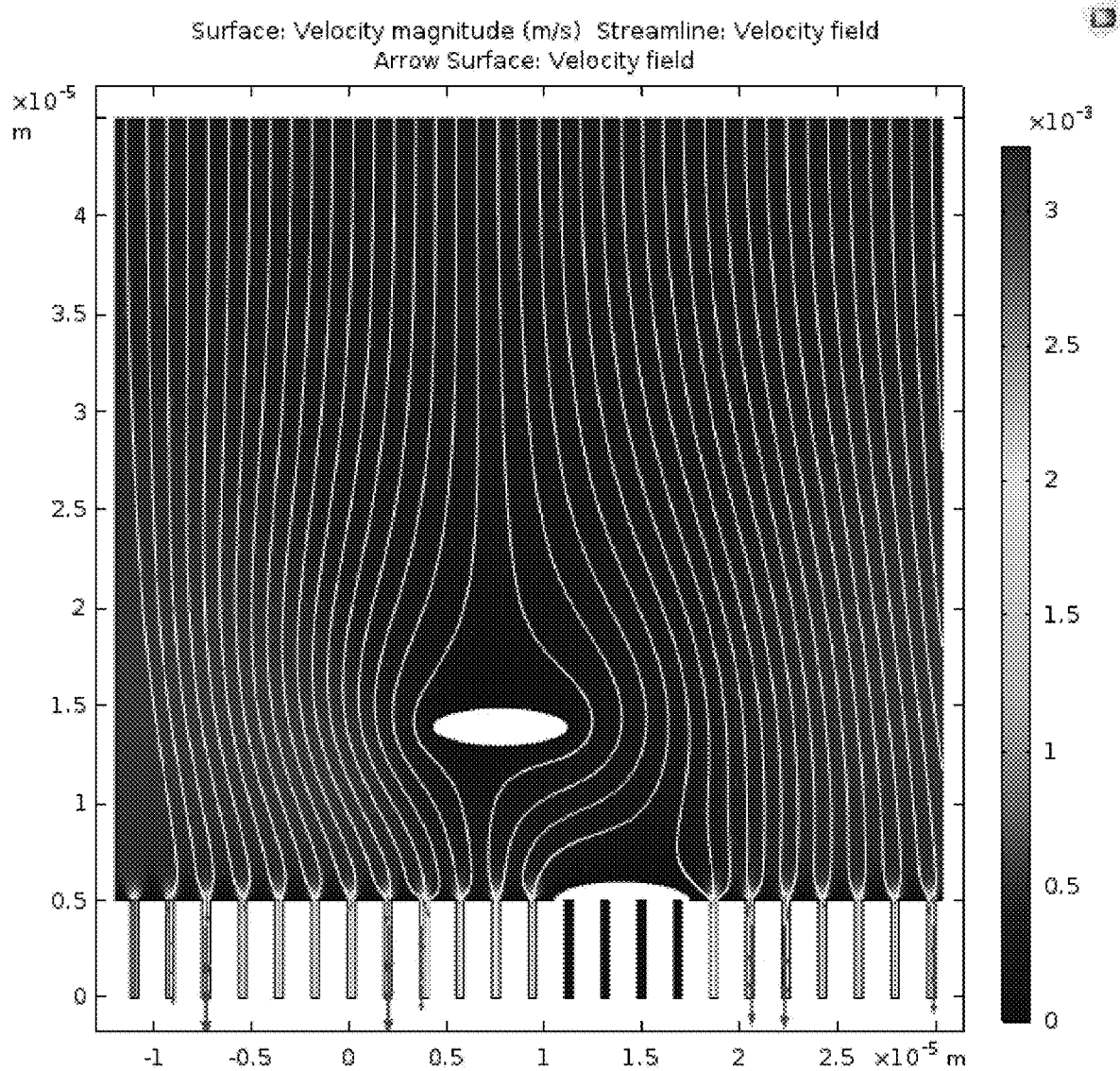
Figure 6I:
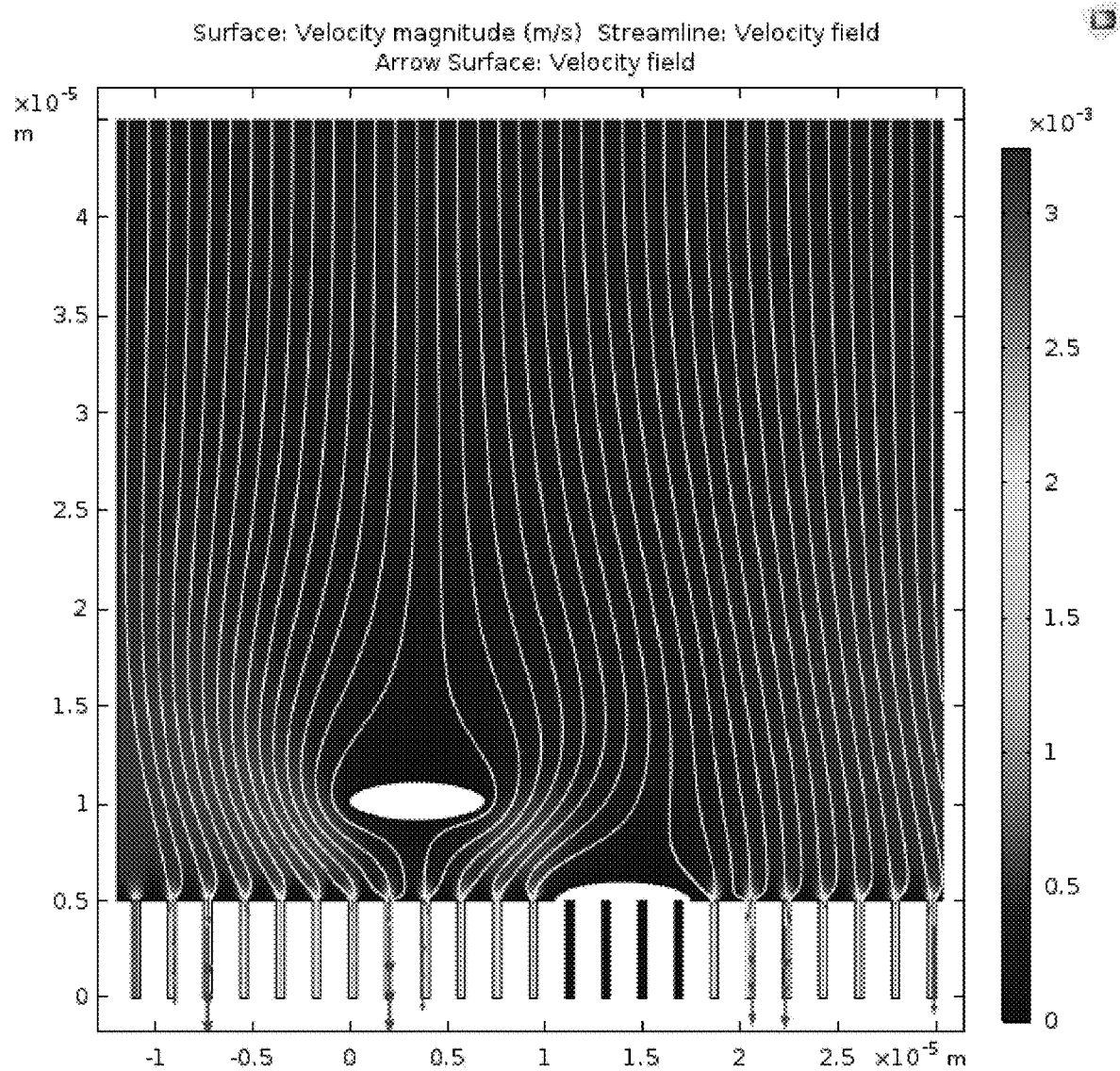
Figure 6J:
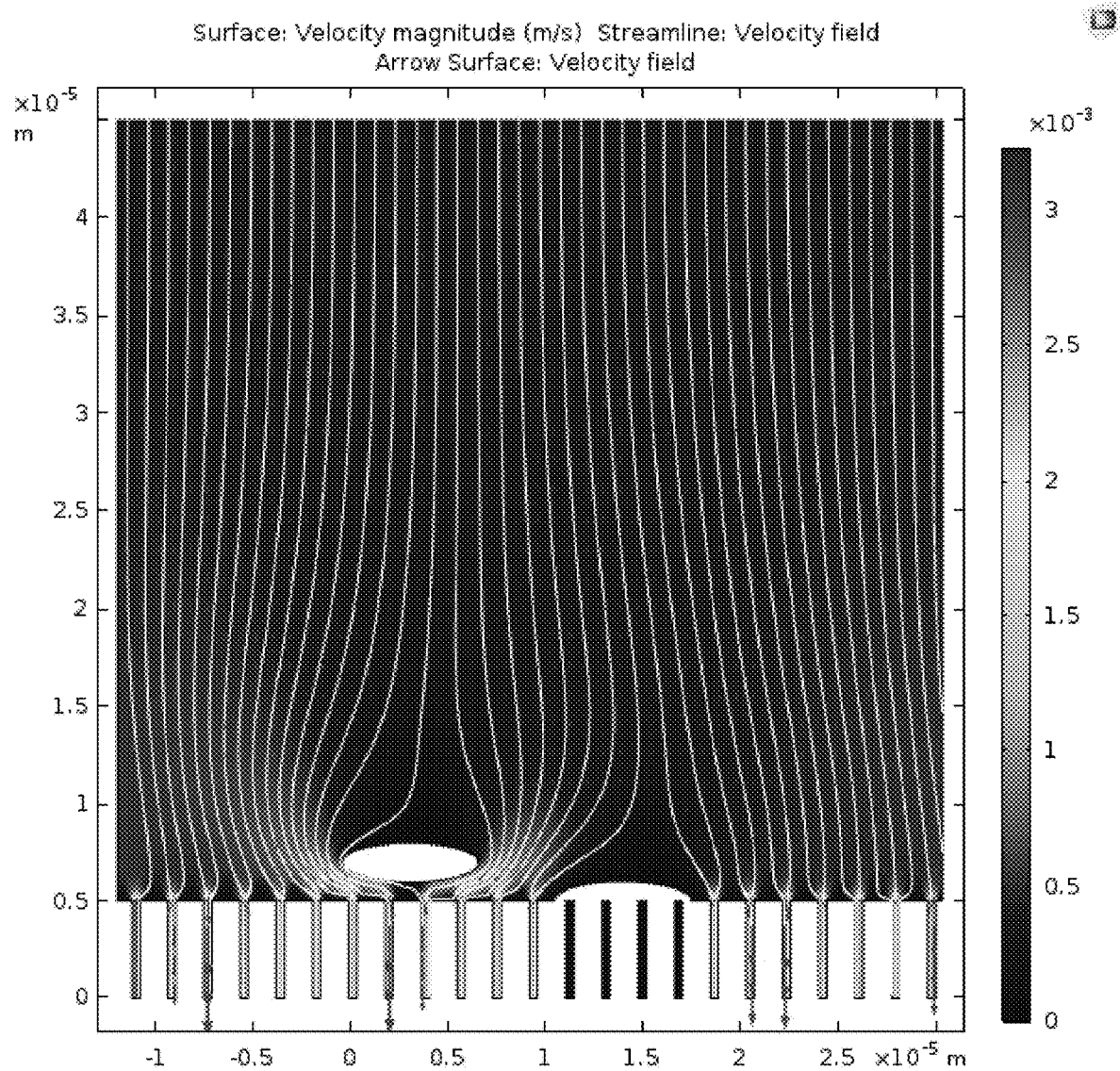
Figure 6K:
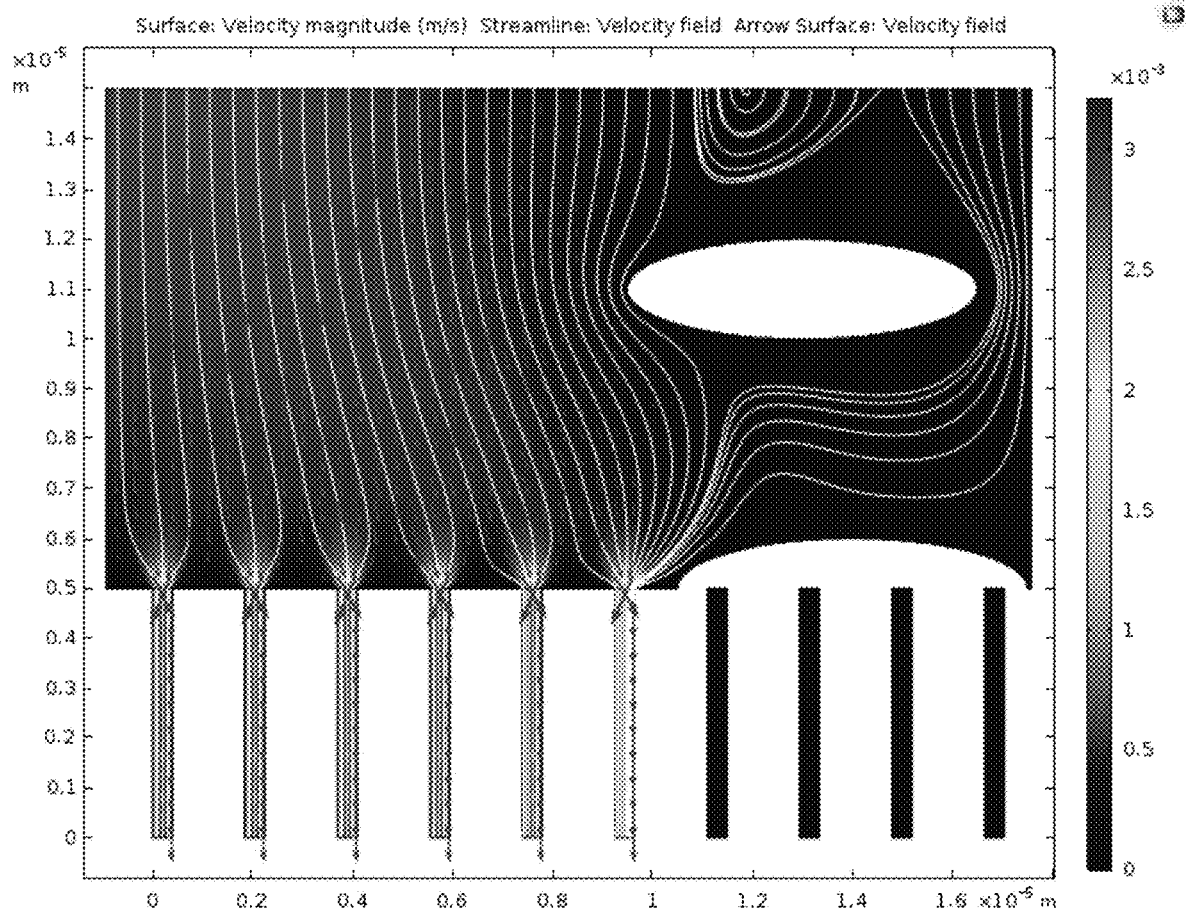

With reference now to FIG. 5, a method 400 for filtration microscopy includes the steps of imaging the membrane 402; providing a vacuum manifold including a manifold top having a plurality of openings, and a capture membrane positioned above and spaced apart from the manifold top 404; applying sample drops to sample spots on the membrane, the sample spots positioned above the plurality of openings 406; applying a negative pressure to the openings such that the capture membrane deflects and contacts a surface of the manifold top and fluid from the plurality of sample drops is suctioned through the capture membrane 408; and optically imaging particulates on the capture membrane 410. In one embodiment, the imaging device is configured to image the filter both before and after the at least one particle is captured on the filter. See for example U.S. Pat. Pub. 2017/0242234 to Ashcroft et al., incorporated herein by reference. In one embodiment, the imaging device is a camera. In one embodiment, the step of optically imaging includes matching an imaging device field of view to the size and shape of a single hydrophobic ring for whole well imaging. In one embodiment, the plate bottom is dried after the step of applying a negative pressure. In one embodiment, the plurality of sample drops includes a biopharmaceutical solution. In one embodiment, the biopharmaceutical solution includes visible particles, subvisible particles and nanometer scale particles. In one embodiment, the particulates include protein aggregates. In one embodiment, the particulates include at least one of polysorbate particles, metallic particles, rubber particles, silicone oil droplets, salt crystals, cellulose and sucrose particles. In one embodiment, the sample drops include a viscosity between 1 cP and 200 cP. Sample drop viscosity can be higher in certain embodiments. For example, samples of foods and oils may in certain embodiments have a viscosity of 300 cP, 500 cP, 1,000 cP, 5,000 cP, 17,000 cP or more. In one embodiment, the sample drops include a tag to perform at least one of fluorescent identification and protein activity monitoring. In one embodiment, the method includes the step of applying a drop comprising a tag after the step of applying a negative pressure to perform at least one of fluorescent identification and protein activity monitoring. In one embodiment, the method includes the step of generating a data visualization image based on the imaging and indicative of dispersion of the particulates.

Now, with reference to FIGS. 6A-6K, a laminar flow fluid mechanics simulation is shown. Advantageously, according to embodiments of the system described herein, as one or more pores gets blocked by a particle resting on the capture membrane (the bottom particle), the streamlines are diverted into the next open pore or pores, and therefore stacking of subsequent moving particles (the top particle) on top of resting particles is inherently engineered out of the system (see progression shown in FIGS. 6A-6J). In the magnified view of FIG. 6K, the streamlines are shown in more detail, diverting the top moving particle away from the bottom resting particle, therefore avoiding particle stacking on the capture membrane. The laminar flow form of the Navier-Stokes equations were solved for the domain shown in FIGS. 6A-6J and at each time-step the effect of the fluid mechanical forces on the particle were computed to estimate the new position. Computations were performed using a commercial finite element package. Accordingly, embodiments of the filtration manifold assembly described herein ensures laminar flow to reduce particle stacking and produce better quality particle analysis. The vacuum manifold enables highly uniform spatial distribution of particles present in liquid dispersions onto a capture membrane for improved particle analysis. Particles from the liquid sample are deposited on the capture membrane in such a way as to minimize particle overlap. This avoids the issue where particles that are touching or overlapping with each other could be counted as one, larger particle, rather than two smaller ones. By optimizing laminar flow, fluid will flow around resting particles, directing other particles away from them, and particles are less likely to touch each other.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A vacuum manifold for filtration microscopy comprising:
   a manifold top comprising a plurality of protrusions each defining a perimeter of a plurality of openings; and a capture membrane positioned above and spaced apart from the manifold top, wherein the capture membrane is configured to deflect into contact with the plurality of protrusions when a negative pressure is applied to the plurality of openings.

2. The vacuum manifold of claim 1, wherein each of the plurality of protrusions is a contacting ring.

3. The vacuum manifold of claim 2, wherein the capture membrane further comprises a plurality of hydrophobic rings defining a plurality of sample spots.

4. The vacuum manifold of claim 3, wherein the hydrophobic rings are positioned directly above the contacting rings.

5. The vacuum manifold of claim 4, wherein at least a portion of the contacting rings are positioned directly below the sample spots.

6. The vacuum manifold of claim 3 wherein at least one of the hydrophobic rings and the contacting rings are non-circular rings.

7. The vacuum manifold of claim 1 further comprising:
a housing defining a cavity and configured to seat the manifold top, wherein the cavity is in fluid communication with the plurality of openings.

8. The vacuum manifold of claim 7 further comprising:
a vacuum port in fluid communication with the cavity and configured to connect to a vacuum supply.

9. The vacuum manifold of claim 1 further comprising:
a drying cassette configured to seat blotting paper and the capture membrane.

10. The vacuum manifold of claim 1, wherein the capture membrane comprises pore sizes between about 50 nanometers and 10 microns.

11. The vacuum manifold of claim 1 further comprising a 96 well filter plate in ANSI format.

12. The vacuum manifold of claim 1 further comprising at least one of a 25 mm or a 47 mm membrane filter.

13. The vacuum manifold of claim 1, wherein at least a portion of a surface of the manifold top or capture membrane comprises a non-stick coating.

14. The vacuum manifold of claim 1 further comprising:
a pressure control opening configured in the manifold top and separate from the plurality of openings, wherein the pressure control opening is recessed below a top surface of the plurality of protrusions.

15. The vacuum manifold of claim 1, wherein a space defined by two or more of the plurality of rings, the capture membrane and the manifold top is configured to generate a pressure higher than a negative pressure applied to the plurality of openings and lower than atmospheric pressure.

16. A method for filtration microscopy comprising:
providing the vacuum manifold of claim 1;
applying a plurality of sample drops to a plurality of sample spots on the capture membrane, the plurality of sample spots positioned above the plurality of openings;
applying a negative pressure to the plurality of openings such that the capture membrane deflects and contacts the plurality of protrusions and fluid from the plurality of sample drops is suctioned through the capture membrane; and
optically imaging particulates on the capture membrane.

17. The method of claim 16 further comprising:
optically imaging the capture membrane prior to the step of applying a plurality of sample drops.

18. The method of claim 16, wherein the plurality of sample drops comprises a biopharmaceutical solution.

19. The method of claim 18, wherein the biopharmaceutical solution comprises visible particles, subvisible particles and nanometer scale particles.

20. The method of claim 16, wherein the particulates comprise protein aggregates.

21. The method of claim 16, wherein the particulates comprise at least one of polysorbate particles, metallic particles, rubber particles, silicone oil droplets, salt crystals, cellulose and sucrose particles.

22. The method of claim 16, wherein the sample drops comprise a viscosity between 1 cP and 200 cP.

23. The method of claim 16, wherein sample drops comprise a tag to perform at least one of fluorescent identification and protein activity monitoring.

24. The method of claim 16 further comprising:
applying a drop comprising a tag after the step of applying a negative pressure to perform at least one of fluorescent identification and protein activity monitoring.

25. The method of claim 16 further comprising:
generating a data visualization image based on the imaging and indicative of dispersion of the particulates.

26. The method of claim 16, wherein the capture membrane further comprises a plurality of hydrophobic rings defining the plurality of sample spots, wherein the step of optically imaging further comprises:
matching an imaging device field of view to the size and shape of a single hydrophobic ring for whole well imaging.

* * * * *